United States Patent
Shumaker

(10) Patent No.: US 10,319,548 B2
(45) Date of Patent: Jun. 11, 2019

(54) SHOCK-RESISTANT ELECTRICAL SWITCH

(71) Applicant: AeroVironment, Inc., Monrovia, CA (US)

(72) Inventor: Scott Ryan Shumaker, Alta Loma, CA (US)

(73) Assignee: WEBASTO CHARGING SYSTEMS, INC., Simi Valley, CA (US)

( * ) Notice: Subject to any disclaimer, the term of this patent is extended or adjusted under 35 U.S.C. 154(b) by 0 days.

(21) Appl. No.: 15/604,149

(22) Filed: May 24, 2017

(65) Prior Publication Data
US 2017/0345594 A1    Nov. 30, 2017

Related U.S. Application Data

(60) Provisional application No. 62/342,397, filed on May 27, 2016.

(51) Int. Cl.
| | | |
|---|---|---|
| *H01H 50/30* | (2006.01) | |
| *H01H 50/02* | (2006.01) | |
| *H01H 49/00* | (2006.01) | |
| *H01H 50/04* | (2006.01) | |
| *B60L 53/00* | (2019.01) | |
| *H01H 50/58* | (2006.01) | |

(52) U.S. Cl.
CPC ............. *H01H 50/30* (2013.01); *B60L 53/00* (2019.02); *H01H 49/00* (2013.01); *H01H 50/023* (2013.01); *H01H 50/04* (2013.01); *H01H 50/58* (2013.01)

(58) Field of Classification Search
CPC ........................................ H01H 50/24–50/305
See application file for complete search history.

(56) References Cited

U.S. PATENT DOCUMENTS

| | | |
|---|---|---|
| 2,800,546 A | 7/1957 | Paul |
| 3,529,105 A | 9/1970 | Huffman |
| 3,566,058 A * | 2/1971 | Elliott .................... H01H 13/28 200/463 |
| 3,809,834 A | 5/1974 | Hipple |
| 4,105,882 A | 8/1978 | Ulbing et al. |

OTHER PUBLICATIONS

International Search Report and Written Opinion for PCT Serial No. PCT/US17/34234 dated Sep. 27, 2017.

* cited by examiner

*Primary Examiner* — Ramon M Barrera
(74) *Attorney, Agent, or Firm* — Brooks Acordia IP Law, PC; Michael Zarrabian

(57) ABSTRACT

Systems, devices, and methods for an electrical switch including: an enclosure; a hinged armature disposed within the enclosure; a moveable contact electrically coupled to the hinged armature and disposed substantially parallel to the hinged armature; and a rib positioned between the hinged armature and an outer edge of the electrical switch, where the rib transfers external forces applied to the electrical switch to the enclosure by limiting movement of the hinged armature towards an outer edge of the electrical switch.

20 Claims, 12 Drawing Sheets

SHOCK-RESISTANT ELECTRICAL SWITCH

CROSS-REFERENCE TO RELATED APPLICATIONS

This application claims priority to and the benefit of U.S. Provisional Patent Application No. 62/342,397, filed May 27, 2016, the contents of which are hereby incorporated by reference herein for all purposes.

TECHNICAL FIELD

Embodiments relate generally to systems, methods, and devices for electrical switches, and more particularly to shock-resistant electrical switches.

BACKGROUND

An electrical switch may be turned on by passing current through a magnetic coil, which causes an armature to move from a first position contacting a normally closed contact to a second position contacting a normally open contact. When current is stopped to the magnetic coil, the armature moves from the second position back to the first position via a spring attached to the armature.

SUMMARY

Exemplary electrical switch embodiments may include: an enclosure; a hinged armature disposed within the enclosure; a moveable contact electrically coupled to the hinged armature and disposed substantially parallel to the hinged armature; and a rib positioned between the hinged armature and an outer edge of the electrical switch, where the rib may transfer external forces applied to the electrical switch to the enclosure by limiting movement of the hinged armature towards the outer edge of the electrical switch. In additional device embodiments, the hinged armature and the moveable contact may deflect towards the outer edge of the electrical switch upon application of an external force, and the rib may limit the deflection of the hinged armature and the moveable contact. In additional device embodiments, the moveable contact may include a resilient material, and the moveable contact may be susceptible to deform relative to the hinged armature. The moveable contact may be made of copper.

In additional device embodiments, the hinged armature may move between a first position contacting a normally closed contact and a second position contacting a normally open contact, and the rib may limit movement of the hinged armature and the moveable contact between the first position and the second position. The rib may be secured in an opening cut into the enclosure and/or molded into the enclosure. The rib may be at least one of: a cuboid and a cylinder. Additional device embodiments may also include: a fixed armature, where the hinged armature may be rotatably connected to the fixed armature about a hinge; and a yoke disposed on the hinged armature, where the yoke may limit separation of the fixed armature and the hinged armature about the hinge.

Exemplary method embodiments may include: placing an enclosure over an electrical switch; and securing the enclosure to the electrical switch; where the enclosure may include a rib positioned between a hinged armature and an outer edge of the switch, where the rib may transfer external forces applied to the electrical switch to the enclosure by limiting movement of the hinged armature towards the outer edge of the switch. Additional method embodiments may include removing a stock enclosure from the electrical switch.

Additional method embodiments may include: cutting an opening into the enclosure; and securing the rib in the opening. The rib may be a cuboid, and securing the rib may further include: securing a top face of the cuboid at a top surface of the enclosure via an adhesive; securing a bottom face of the cuboid at a bottom surface of the electrical switch via the adhesive; and securing a side face of the cuboid at a surface of the enclosure proximate the outer edge of the switch via the adhesive. The rib may be a cylinder in some embodiments, and securing the rib may further include: securing a top surface of the cylinder at a top surface of the enclosure via an adhesive; and securing a bottom surface of the cylinder at a bottom surface of the electrical switch via the adhesive. The rib may be molded into the enclosure. A moveable contact may be electrically coupled to the hinged armature and disposed substantially parallel to the hinged armature, where the hinged armature and the moveable contact may move between a first position contacting a normally closed contact and a second position contacting a normally open contact, and the rib may limit movement of the hinged armature past the first position and towards the outer edge of the switch distal from the second position.

Exemplary system embodiments may include: an electrical vehicle supply equipment (EVSE); and an electrical switch disposed in the EVSE for initiating charging after at least one safety check, where the electrical switch may include a rib positioned between a hinged armature and an outer edge of the electrical switch, and the rib may transfer external forces applied to the electrical switch to the enclosure by limiting movement of the hinged armature towards the outer edge of the electrical switch. The external force may be at least one of: dropping the EVSE on a surface, and forces imparted on the EVSE during operation of an electric vehicle (EV) when the EVSE is stored in the EV. The electrical switch may be a T90 style relay. In additional system embodiments, the electrical switch may further include: a fixed armature, where the hinged armature may be rotatably connected to the fixed armature about a hinge; and a yoke disposed on the hinged armature, where the yoke may limit separation of the fixed armature and the hinged armature about the hinge.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present system allows for a shock-resistant electrical switch. Electrical switches disposed in electric vehicle supply equipment (EVSE) may be subject to increased shock and external forces as a result of being dropped on a hard surface by a user or during storage in an electric vehicle (EV) while the EV is being driven on uneven roads. These electrical switches may be particularly vulnerable to having a moveable contact of an armature overextend, deflect, and deform as a result of these external forces. This deflection may cause the moveable contact to contact a normally open contact and/or both a normally open contact and a closed contact before it is turned on, i.e., a switch failure. As the electrical switch may prevent charging of an EV if a safety check is not passed, the result of a failed switch could be catastrophic.

In the disclosed system, a rib is added between the armature and an outer edge of the switch. The rib transfers external forces applied to the electrical switch to the enclosure by limiting movement of the armature towards the outer edge of the switch. The rib prevents the moveable contact from deflecting during application of an external force and maintaining the deflection such that it causes a switch failure. The armature may be limited in movement in two axes by the position of a magnetic coil contact, a spring connecting a hinged armature to a fixed armature, a bonding strap connecting the hinged armature to the fixed armature, and a hinge connecting the hinged armature to the fixed armature. However, the armature may be susceptible to movement towards an outer edge of the electrical switch distal from the magnetic coil contact. This movement towards an outer edge of the electrical switch may deform the moveable contact that is electrically coupled to the hinged armature and disposed substantially parallel to the hinged armature. The moveable contact is generally made of a thin and conductive material, such as copper. The moveable contact can permanently deform as a result of the movement of the hinged armature towards the outer edge of the switch, which could result in switch failure.

Figure 1A:
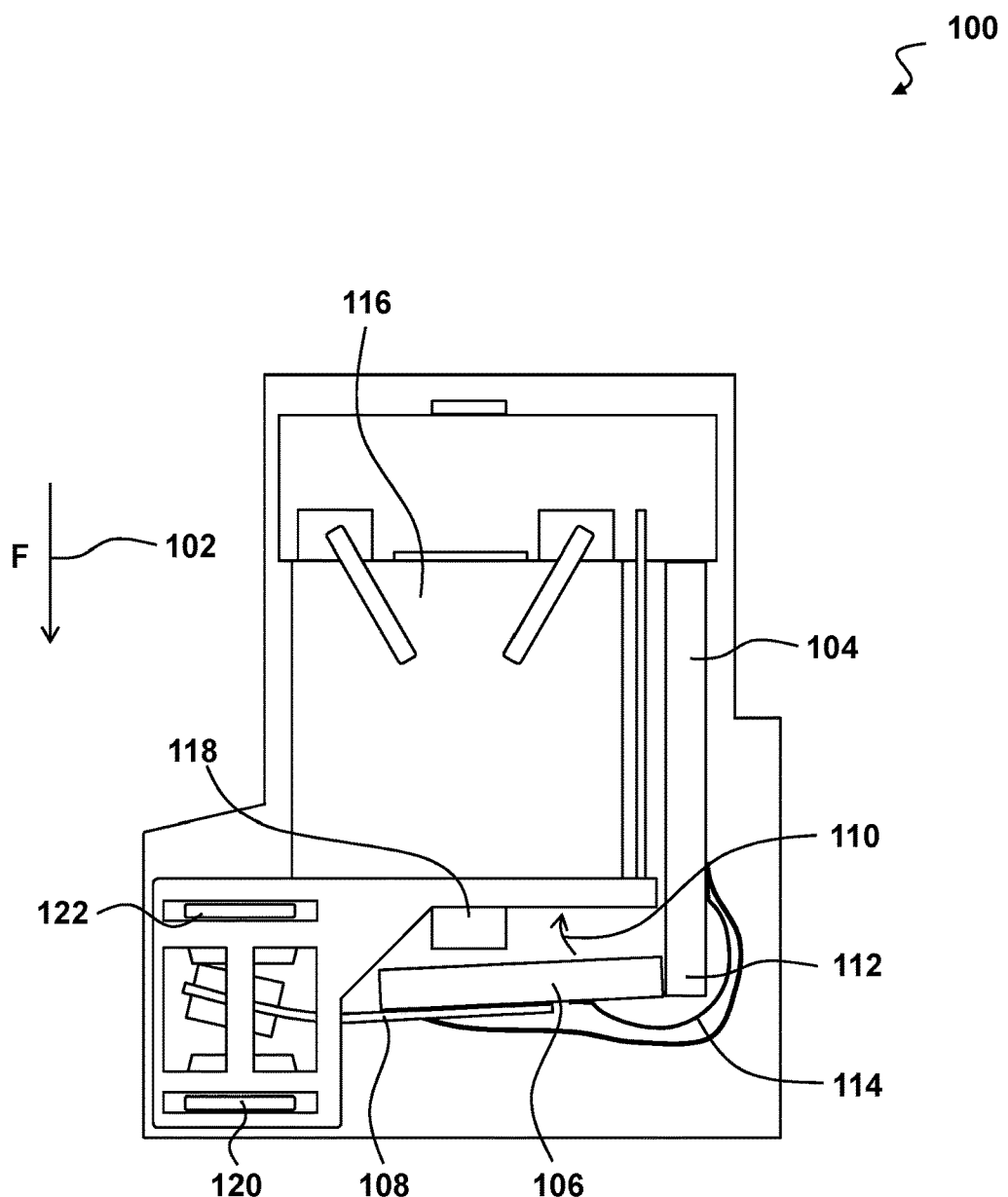
FIG. 1A depicts a top view of an electrical switch that has been damaged as a result of force applied to the electrical switch.

FIG. 1A depicts a top view of an electrical switch 100 that has been damaged as a result of force 102 applied to the electrical switch 100. The switch 100 is depicted without an enclosure. The switch 100 armature includes a fixed armature 104, a hinged armature 106, and a moveable contact 108. The hinged armature 106 may pivot 110 relative to the fixed armature 104 at hinge 112. A spring 114 maintains the hinged armature 106 in a first position, as shown in FIG. 1A, relative to the fixed armature 104. When an electric current is passed through a magnetic coil 116 to create a magnetic field, the hinged armature 106 pivots 110 to touch a contact 118 of the magnetic coil 116 in a second position. When the current is stopped, the spring 114 pivots 110 the hinged armature 106 back to the first position. During ideal operating conditions, the moveable contact 108 is in contact with the normally closed contact 120 in the first position and the normally open contact 122 in the second position. The electrical switch 100 in FIG. 1A has been damaged as a result of forces 102 applied to the switch 100, which results in a poor contact alignment. The moveable contact 108 is bent rather than extending substantially parallel to the hinged armature 106. As a result, the moveable contact 108 may touch the normally open contact 122 or both the normally closed contact 120 and the normally open contact 122 in the first position.

The movable contact 108 is deformed from force 102 applied to the switch 100. Instead of only contacting the normally closed contact 120 in the first position, the moveable contact 108 is touching the normally open contact 122. This malfunction caused by force 102 may create a dangerous situation if, for example, the switch 100 is being used to close an electrical current in a ground fault or another error is detected in an electric vehicle supply equipment (EVSE).

Figure 1B:
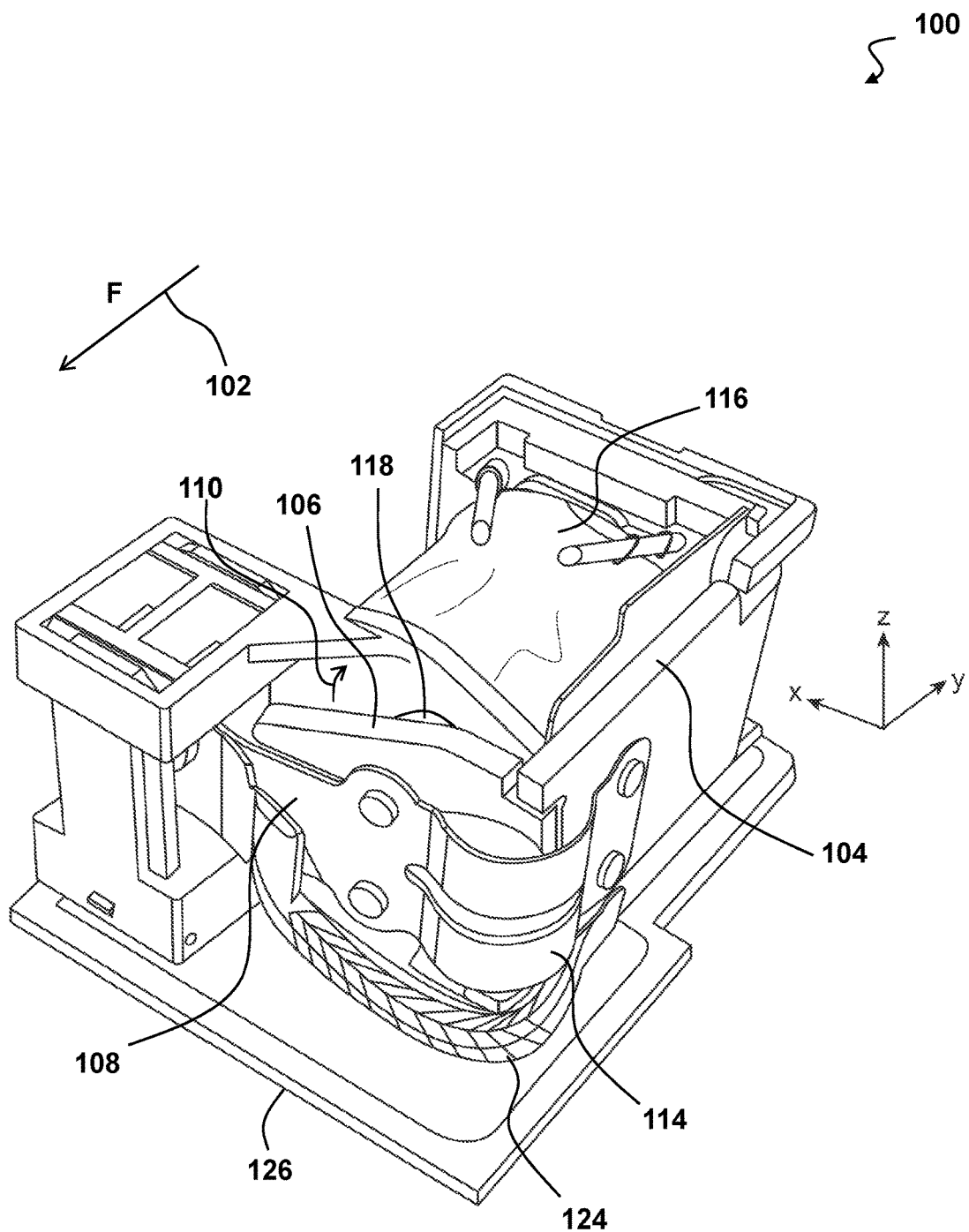
FIG. 1B depicts a perspective view of the damaged electrical switch of FIG. 1A where the armature of the electrical switch is deformed.

FIG. 1B depicts a perspective view of the damaged electrical switch 100 of FIG. 1A where the armature of the electrical switch 100 is deformed. Movement of the hinged armature 106 and moveable contact 108 is restrained in the X- and Z-axis by the fixed armature 104, spring 114, and bonding strap 124. Movement in the −Y-axis is not restrained so that the hinged armature 106 can pivot 110 between the first position and the second position. As a result of force 102 applied in the −Y-axis, such as by dropping the switch on a wall of the enclosure proximate an outer edge 126 of the switch, the hinged armature 106 pivots 110 away from the contact 118 of the magnetic coil 116 and towards the outer edge 126 of the switch 100. This movement may cause the moveable contact 108 to bend. The moveable contact 108 may be a thin material constructed from, for example, copper. After repeated forces 102, the moveable contact 108 may retain a bend, which may cause the switch 100 to fail.

Figure 2A:
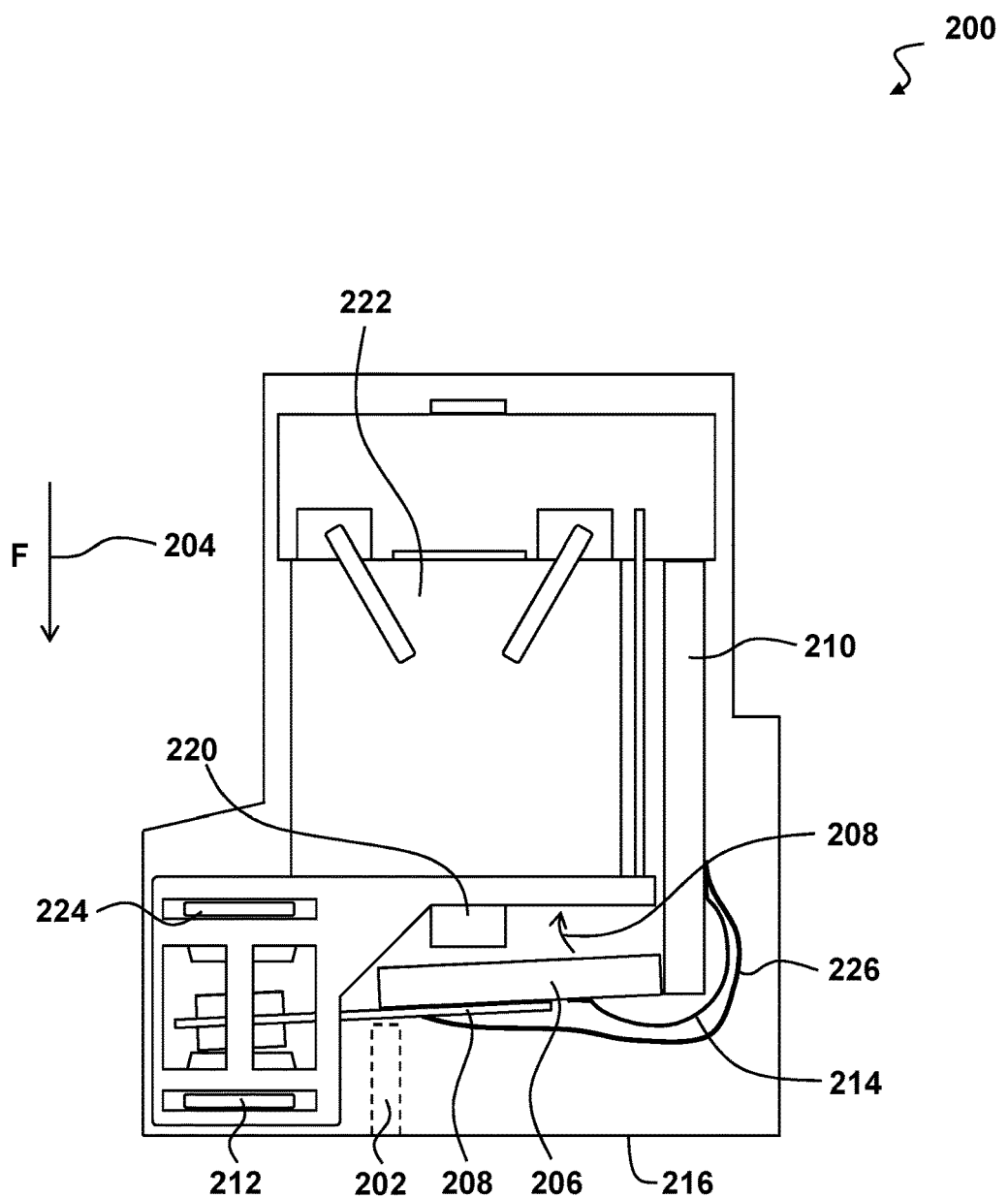
FIG. 2A depicts a top view of an exemplary electrical switch in a first position with a rib for resisting external forces shown in dashed lines.

FIG. 2A depicts a top view of an exemplary electrical switch 200 in a first position with a rib 202 for resisting external forces shown in dashed lines. When a force 204 is applied to the switch 200, the rib 202 limits movement of a hinged armature 206 and moveable contact 208 in a single direction and prevents them from overextending, which keeps the alignment of the contacts true. Any force 204 applied to the hinged armature 206 is thereby transferred from the hinged armature 206 to an enclosure of the switch 200. As a result of the limited movement of the hinged armature 206 and moveable contact 208, the moveable contact 208 is more likely to retain its shape generally parallel to the hinged armature 208 and the moveable contact 208 is less likely to deform.

The moveable contact 208 in the switch 200 may be constructed of copper and may be significantly thinner than the hinged armature 206 or fixed armature 210. The hinged armature 206 and fixed armature 210 may be constructed of tin, tin-plated steel, or other magnetic materials. Increasing the thickness of the moveable contact 208 may be cost prohibitive and/or interfere with the normal operation of the switch 200. The moveable contact 208 is in contact with a normally closed contact 212 in the first position. The moveable contact 208 is held against the normally closed contact by the force in spring 214. The rib 202 does not interfere with the normal operation of the switch 100. The rib 202 limits movement of the hinged armature 206 and moveable contact 208 past the first position shown in FIG. 2A and towards an outer edge 216 of the switch 200. This movement towards the outer edge 216 of the switch 200 may occur as a result of force 204, such as dropping the switch 100. Repeated dropping of an electrical switch may cause a failure in a relatively small number of drops, e.g., twenty-five drops for switch failure. The addition of the rib 202 may allow for a greater number of drops before switch failure, e.g., in excess of two-hundred and fifty drops. If the switch 200 is used in an electric vehicle service equipment (EVSE) such as a portable electric vehicle (EV) charger cord set, then it may be subject to external forces such as vibrational loads during transport in a car and during drops by a user of the portable EV charger onto the ground or other hard surface. A switch 200 that can withstand multiple drops from user handling and other outside forces is essential to the safety of the device.

Figure 2B:
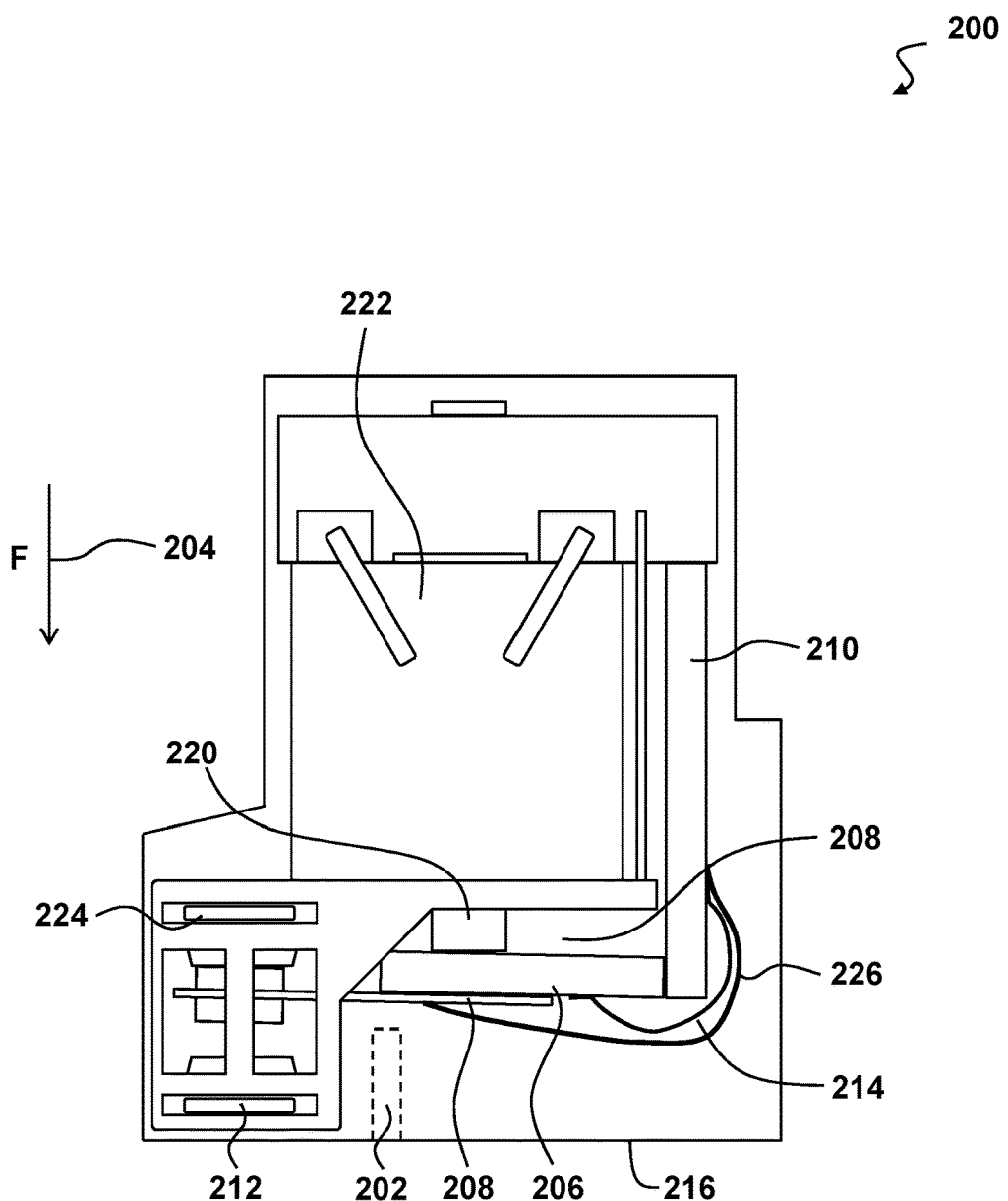
FIG. 2B depicts a top view of the exemplary electrical switch of FIG. 2A in a second position with the rib for resisting external forces shown in dashed lines.

FIG. 2B depicts a top view of the exemplary electrical switch 200 of FIG. 2A in a second position with the rib 202 for resisting external forces shown in dashed lines. The hinged armature 206 pivots 218 to touch a contact 220 of a magnetic coil 222. The moveable contact 208 moves from touching the normally closed contact 212 to touching the normally open contact 224. The rib 202 does not interfere with the hinged armature 206 or moveable contact 208 during movement from the first position to the second position. When an electric current is passed through a magnetic coil 222 to create a magnetic field, the moveable contact 208 moves from the first position touching the normally closed contact 212 to the second position touching the normally open contact 224.

Figure 2C:
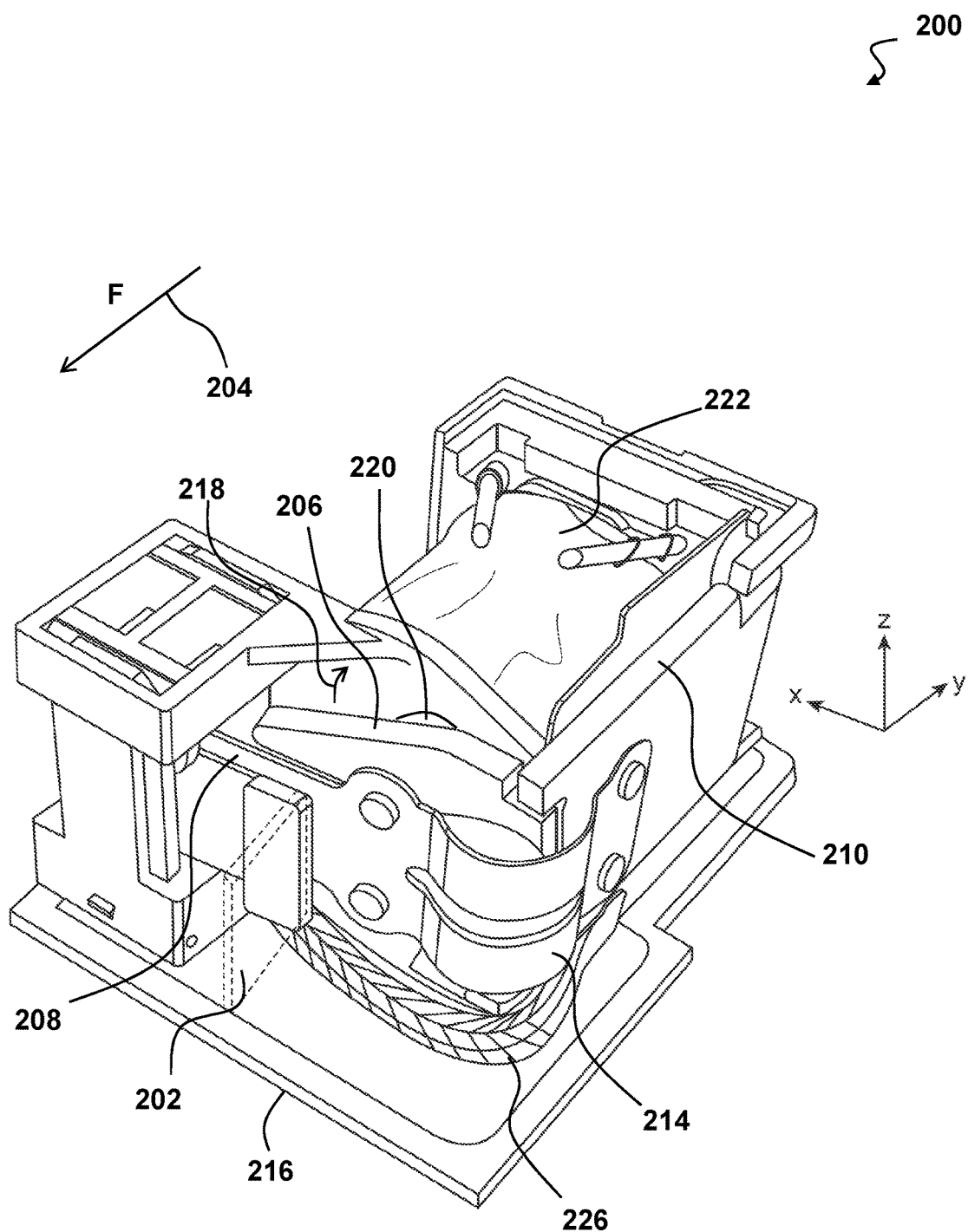
FIG. 2C depicts a perspective view of the exemplary electrical switch of FIG. 2A with the rib for resisting external forces shown in dashed lines.

FIG. 2C depicts a perspective view of the exemplary electrical switch 200 of FIG. 2A with the rib 202 for resisting external forces shown in dashed lines. Movement of the hinged armature 206 and moveable contact 208 is restrained in the X- and Z-axis by the fixed armature 210, spring 214, and bonding strap 226. Movement in the −Y-axis is not restrained so that the hinged armature 206 can pivot 218 between the first position and the second position. As a result of force 204 applied in the −Y-axis, the hinged armature 206 pivots 218 away from the contact 220 of the magnetic coil 222 and towards the outer edge 216 of the switch 200. The movement of the hinged armature 206 towards the outer edge 216 is limited by the rib 202. The rib 202 prevents the moveable contact 208 from deforming by limiting movement of the hinged armature 206 in the −Y-axis occurring as a result of external force 204, such as dropping the switch 200.

The rib 202 may be a block, stop, brace or structure inserted into the space between the armature and a wall of the enclosure to prevent or limit the movement of the hinged armature 206 towards the wall closest to an end of the hinged armature 106 distal from the fixed armature 104 in the first position. The rib 202 may be made of a variety of materials including non-electrically conductive materials to prevent or limit any shorting or undesired transmission, such as plastics, fiberglass, ceramics, glass, rubber, and the like. The rib 202 should be of limited compressibility or deflection. In some embodiments, the rib 202 may be made of a conductive material provided that any such conducting would not produce an adverse effect, such as shorting. In other embodiments the rib 202 may be made of a deformable material provided such deformation still prevents or limits the deformation of the moveable contact 208.

With the hinged armature 206 in contact with the rib 202, the rib 202 will both: limit or prevent any further movement of the hinged armature 106 towards the wall of the enclosure; and take any load or force generated by the hinged armature 206 and thus relieve the rib of the hinged armature 206 from having to transfer such load or force and preventing or limiting strain and/or damage to the hinged armature 206. To keep from interfering with, or otherwise limiting or preventing, the typical operation of the hinged armature 206, a space may be provided between the hinged armature 106 and the rib in the first position. In some embodiments, the space shall run at least the length of the movement of the hinged armature 206 and shall be sized to a minimum width to limit deflection. This minimum width of space may be defined by the potential variations in position of the hinged armature 206, such as play in the hinge between the hinged armature 206 and the fixed armature 210, expansion/contraction due to heating, variations in manufacturing tolerances, variations in component sizing, and the like. This minimum width of space may also be defined by the allowable deflection of the armature hinged 206 prior to any damage occurring to it.

Figure 3A:
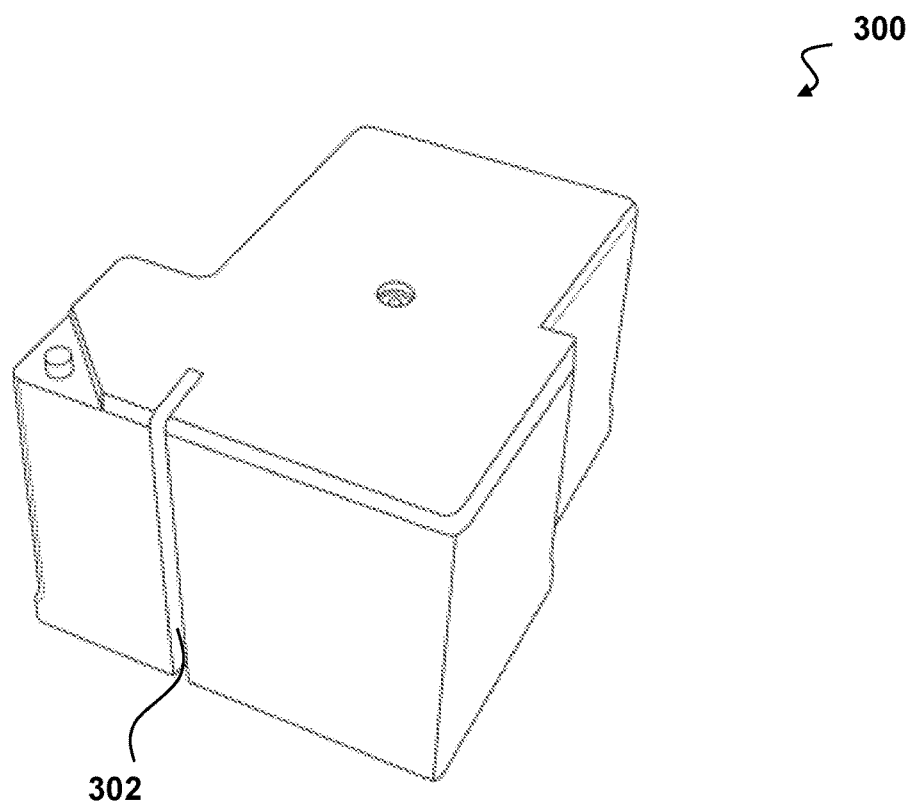
FIG. 3A depicts a perspective view of an exemplary electrical switch enclosure having an opening in the enclosure.

FIG. 3A depicts a perspective view of an exemplary electrical switch enclosure 300 having an opening 302 in the enclosure 300. The enclosure 300 may be a case, container, packaging, or shell having walls that surround an electrical switch. The enclosure 300 may be sealed to the electrical switch to prevent intrusion of liquids, gases, or vapors. Sealing the enclosure 300 allows it to function in a variety of environments without adverse effects. The opening 302 may be cut into the enclosure 300 to a set size and depth. In some embodiments, the opening 302 may be cut into an assembled switch, which includes the enclosure 300 and an electrical switch. In one embodiment, the electrical switch may be a T90 style relay and the opening 302 may be a ¹⁄₃₂ in. wide slot cut to a depth of 0.170 in. at a distance of 0.410 in. from the edge on the side of the enclosure closest to the armature. The dimensions may be modified based on the type of electrical switch and the position of the armature in the electrical switch.

Figure 3B:
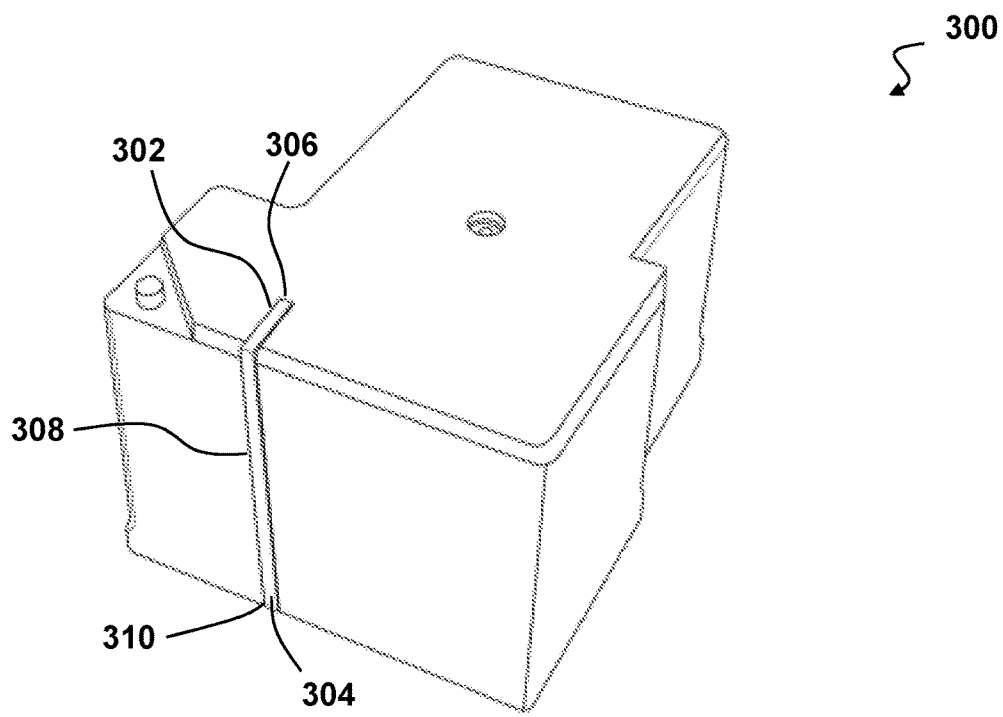
FIG. 3B depicts a perspective view of the exemplary enclosure of FIG. 3A with a rib secured in the opening in the enclosure.
Figure 3C:
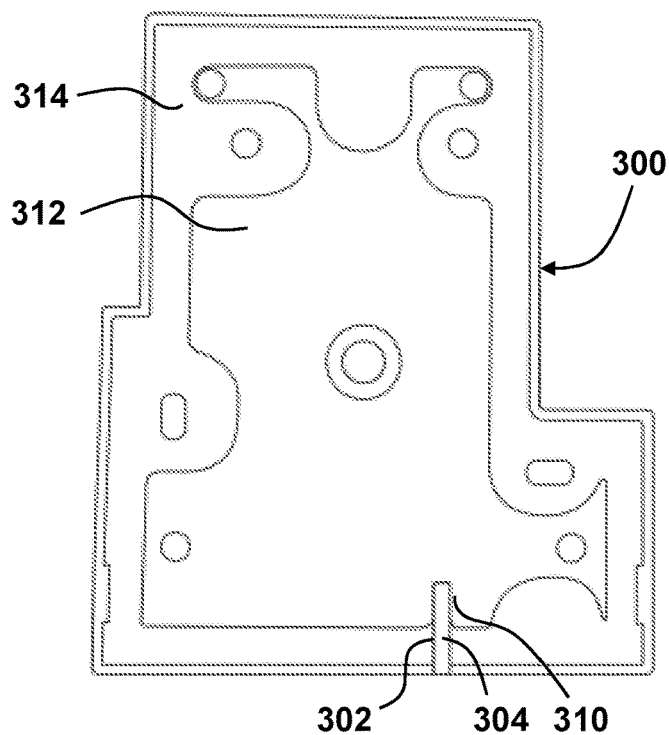
FIG. 3C depicts a bottom view of the exemplary enclosure of FIG. 3A secured to an exemplary electrical switch.

FIG. 3B depicts a perspective view of the exemplary enclosure 300 of FIG. 3A with a rib 304 secured in the opening 302 in the enclosure 300. The rib 304 may be sized to fit within the opening 302 created in the enclosure 300. The rib 304 may be a non-conductive material, such as a plastic. The rib 304 may be rigid for absorbing external forces. The rib 304 may be secured to the enclosure 300 by adhesive 306, 308, 310 on outside surfaces of the rib 300. In embodiments where the opening 302 was created in an assembled switch, the rib 304 may be secured by adhesive 306, 308, 310 on three external surfaces to prevent adhesive from entering the electrical switch and interfering with its normal operation. In one embodiment, the rib 304 may be a 1/32 in. thick epoxy fiberglass with the same or similar dimensions as the opening 302, e.g., 0.170 in.×0.80 in. The rib 304 may be secured with an adhesive, such as a five minute epoxy. To avoid getting adhesive into a body of the electrical switch, the adhesive may only be added on the three edges of the rib 304 that contact an outer housing of the electrical switch FIG. 3C depicts a bottom view of the exemplary enclosure 300 of FIG. 3A secured to an exemplary electrical switch 312. The rib 304 may be inserted into the opening 302 and secured with adhesive 310 on the bottom surface of the electrical switch 312. The enclosure 300 may be secured to the electrical switch 312 by an adhesive 314. The electrical switch 312 may be hermetically sealed from outside elements that may corrode the internal components of the switch 312.

Figure 4A:
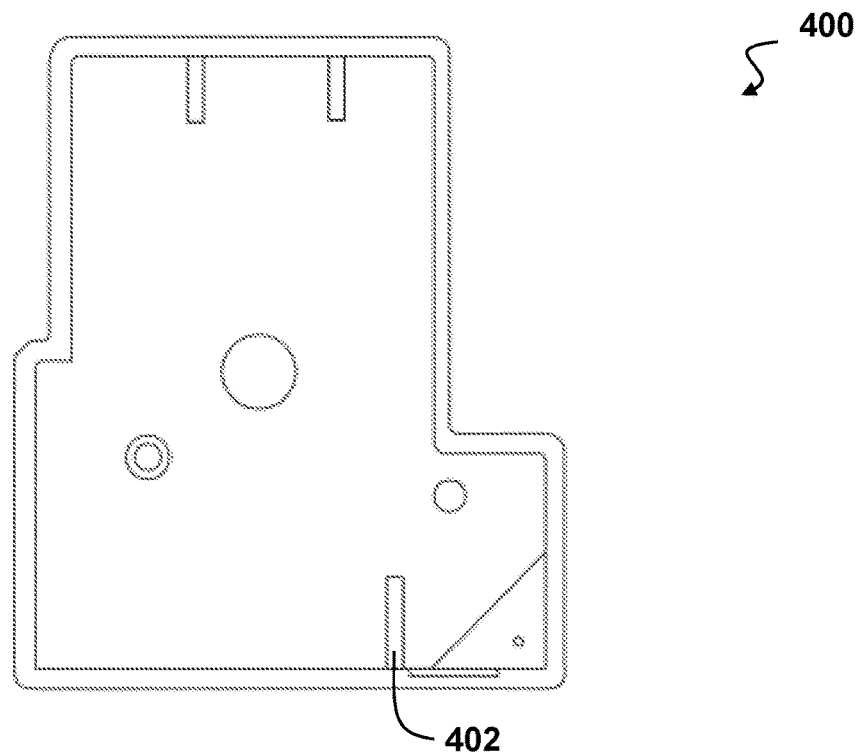
FIG. 4A depicts a bottom view of an exemplary electrical switch enclosure having a rib for resisting external forces applied to an electrical switch.
Figure 4B:
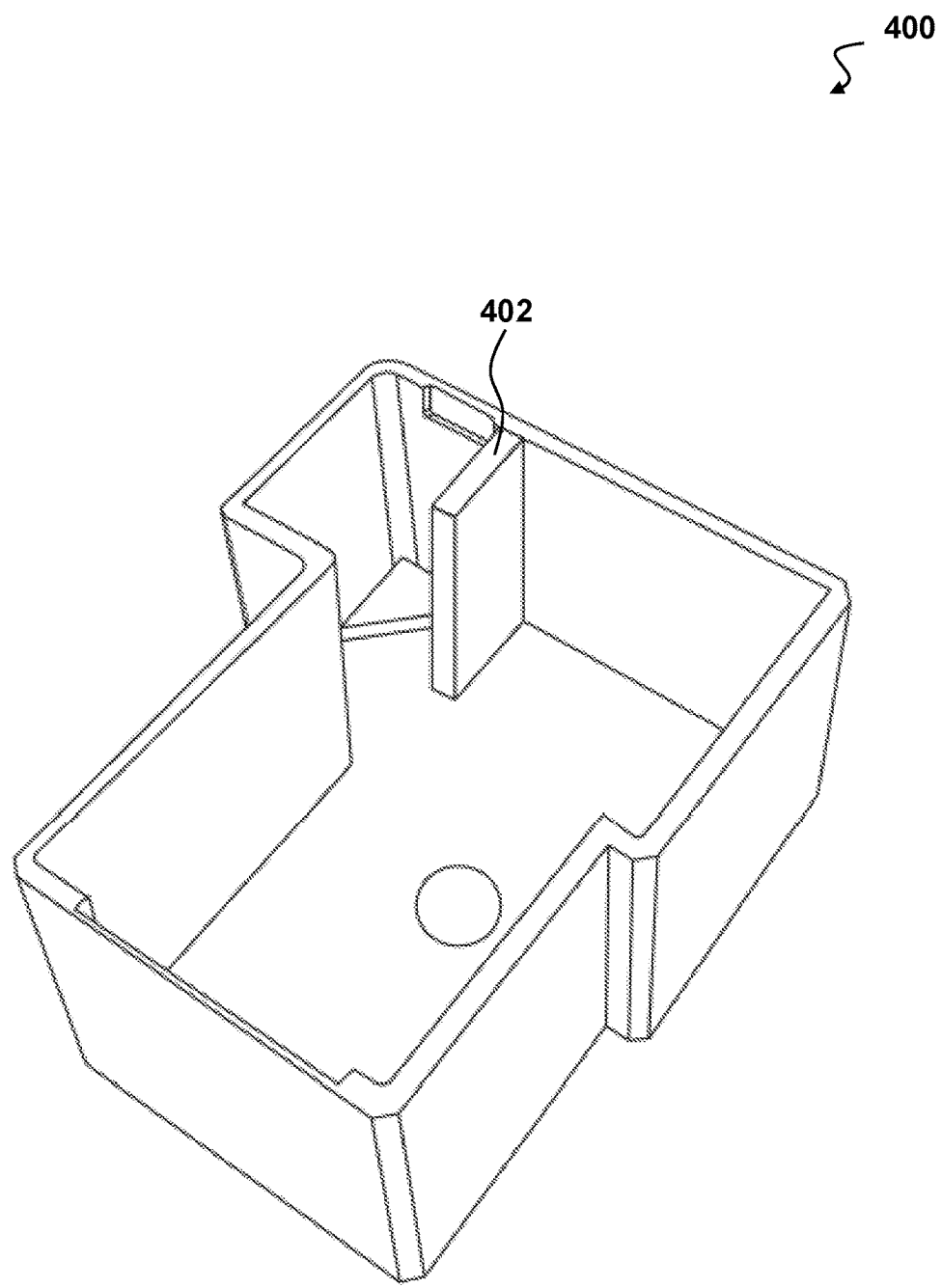
FIG. 4B depicts a perspective view of the exemplary enclosure of FIG. 4A having the rib for resisting external forces applied to the electrical switch.

FIG. 4A depicts a bottom view of an exemplary electrical switch enclosure 400 having a rib 402 for resisting external forces applied to an electrical switch. FIG. 4B depicts a perspective view of the exemplary enclosure 400 of FIG. 4A having the rib 402 for resisting external forces applied to the electrical switch. The enclosure 400 may include a rib 402 that limits movement of a hinged armature to prevent deformation of a moveable contact (See FIGS. 2A-2C). The rib 402 may be molded into the enclosure 400, such as by injection molding. If an electrical switch includes a standard enclosure, it may be removed and replaced with the enclosure 400 that includes the rib 402. The rib 402 may also be added to a standard enclosure, such as by adhesive.

Figure 5:
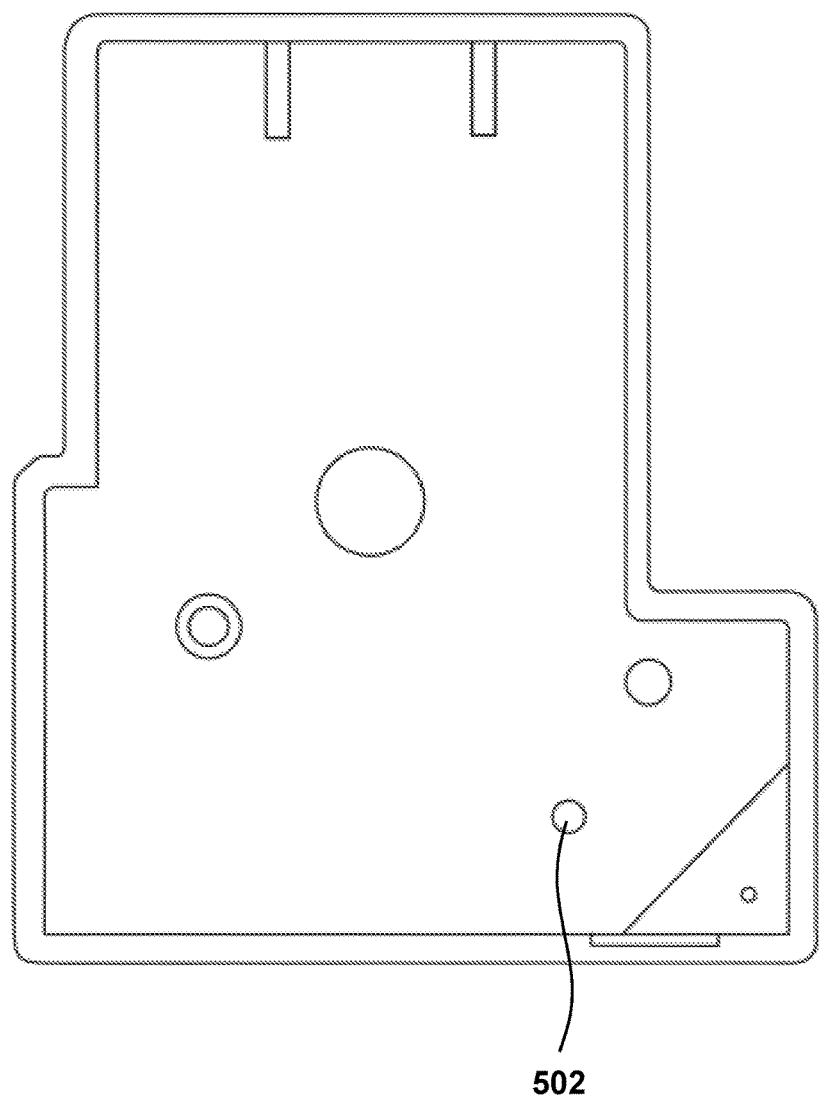
FIG. 5 depicts a bottom view of an alternative embodiment of an exemplary electrical switch enclosure.

FIG. 5 depicts a bottom view of an alternative embodiment of an exemplary electrical switch enclosure 500. The enclosure includes a cylindrical rib 502 for resisting external forces applied to an electrical switch. The rib may be any shape that resists external forces applied to the electrical switch, e.g., having a round, rectangular, triangular, or other cross-section.

Figure 6A:
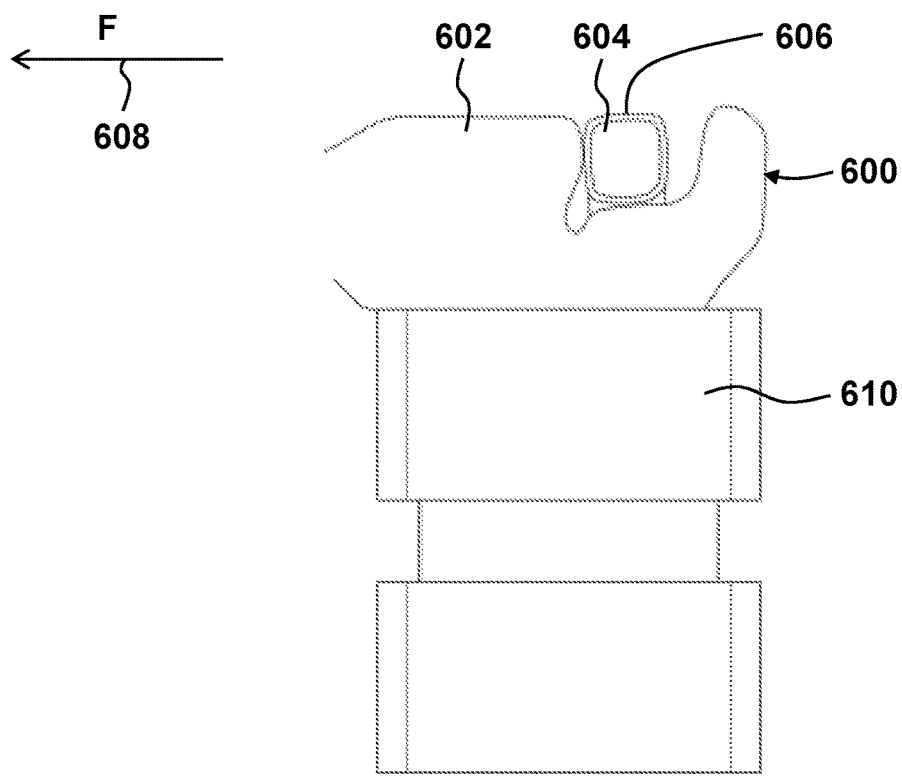
FIG. 6A depicts a front view of an exemplary yoke of an exemplary hinged armature for limiting movement of the hinged armature.
Figure 6B:
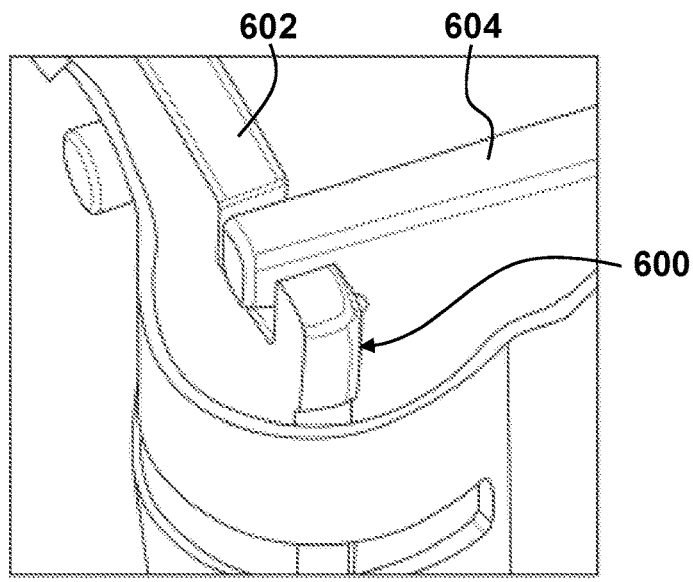
FIG. 6B depicts a perspective view of the exemplary yoke in FIG. 6A.

FIG. 6A depicts a front view of an exemplary yoke 600 of an exemplary hinged armature 602 for limiting movement of the hinged armature 602. FIG. 6B depicts a perspective view of the exemplary yoke 600 in FIG. 6A. The yoke 600 prevents separation of the hinged armature 602. The hinged armature 602 is connected to a fixed armature 604 about hinge 606. The hinged armature 602 may separate from the fixed armature 604 as a result of force 608. Separation of the fixed armature 604 and the hinged armature 602 may be limited by the spring 610, but may still occur. The yoke 600 provides a stop to limit separation of the fixed armature 604 and the hinged armature.

Figure 7:
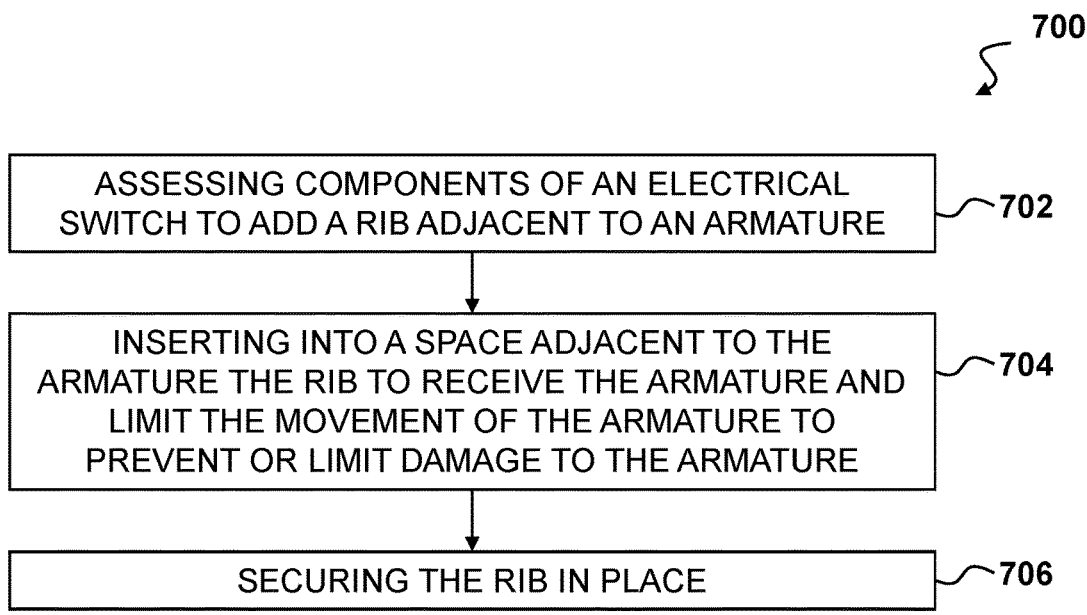
FIG. 7 depicts a flow chart of an exemplary method for limiting external forces applied to an armature of an electrical switch.

FIG. 7 depicts a flow chart of an exemplary method 700 for limiting external forces applied to an armature of an electrical switch. The method 700 may include accessing components of an electrical switch to add a rib adjacent to an armature (step 702). The method 700 may also include inserting into a space adjacent to the armature the rib to receive the armature and limit the movement of the armature to prevent or limit damage to the armature (step 704). The method 700 may then include securing the rib in place (step 706).

Figure 8:
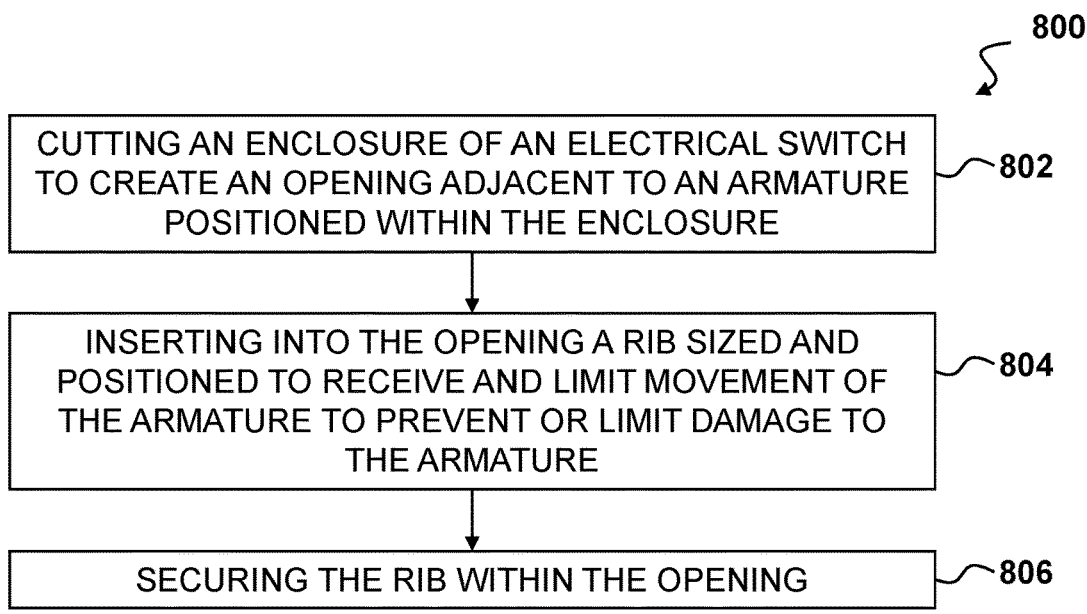
FIG. 8 depicts a flow chart of an exemplary method for modifying an electrical switch to add a rib that resists external forces applied to an armature of the electrical switch.

FIG. 8 depicts a flow chart of an exemplary method 800 for modifying an electrical switch to add a rib that resists external forces applied to an armature of the electrical switch. The method may include cutting an enclosure of an electrical switch to create an opening adjacent to the armature positioned within the enclosure (step 802). The method may then include inserting into the opening a rib sized and positioned to receive and limit movement of the armature to prevent or limit damage to the armature (step 804). The method may also include securing the rib within the opening (step 806). The electrical switch may be an existing switch and the cutting be made by a saw to a defined depth to avoid contacting the armature while being sufficiently close to the armature to allow the rib to be inserted into the opening to receive and prevent or limit movement of the armature during a deflection caused by a drop or other application of force to the switch. The inserted rib may be fiberglass. In other embodiments, the inserted rib may be any non-conductive material. The rib may be positioned just outside the typical range of movement of the armature as it moves from open to closed positions. The securing of the rib in the opening may be by an adhesive such as a glue or an epoxy.

Figure 9:
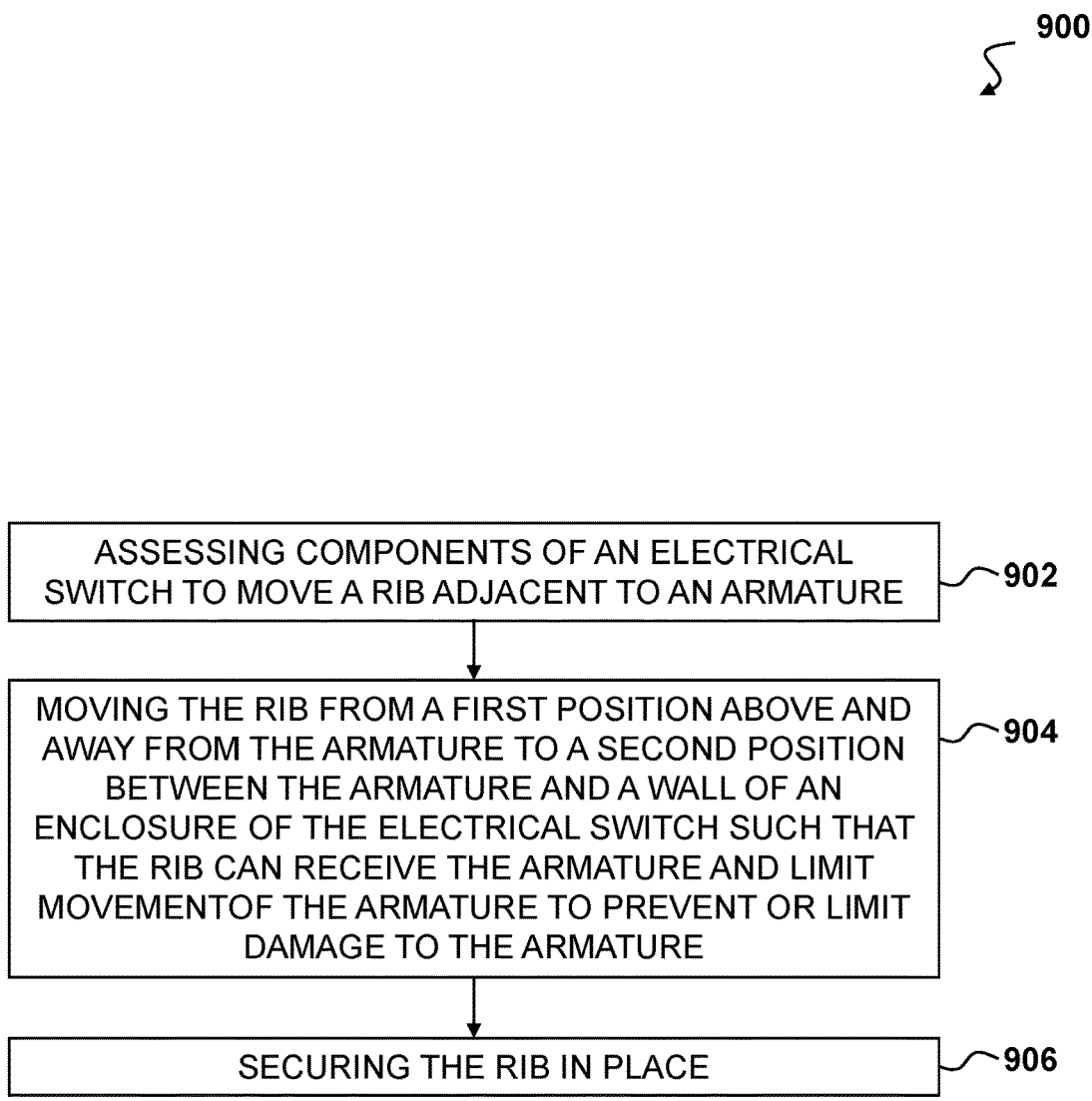
FIG. 9 depicts a flow chart of an exemplary method for modifying an electrical switch enclosure to add a rib that resists external forces applied to an armature of the electrical switch.

FIG. 9 depicts a flow chart of an exemplary method 900 for modifying an electrical switch enclosure to add a rib that resists external forces applied to an armature of the electrical switch. The method 900 may include accessing components of an electrical switch to move a rib adjacent to an armature (step 902). The method may also include moving the rib from a first position above and away from the armature to a second position between the armature and a wall of the enclosure of the switch such that the rib can receive the armature and limit movement of the armature to prevent or limit damage to the armature (step 904). The method may also include securing the rib in place (step 906). In some embodiments, the moved rib may be a braided copper wire that is moved to a position between the armature and a side wall.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. An electrical switch comprising:
   an enclosure;
   a hinged armature disposed within the enclosure, wherein the hinged armature moves in a path of travel from a first position to a second position;
   a moveable contact electrically coupled to the hinged armature and disposed substantially parallel to the hinged armature; and
   a rib positioned outside of the path of travel, wherein the rib is positioned between the hinged armature and an outer edge of the electrical switch, and wherein the rib transfers an external force applied to the electrical switch to the enclosure by limiting movement of the hinged armature outside of the path of travel.

2. The electrical switch of claim 1 wherein the hinged armature and the moveable contact deflect towards the outer edge of the electrical switch upon application of the external force, and wherein the rib limits the deflection of the hinged armature and the moveable contact.

3. The electrical switch of claim 1 wherein the moveable contact comprises a resilient material, and wherein the moveable contact is susceptible to deform relative to the hinged armature.

4. The electrical switch of claim 3, wherein the moveable contact is made of copper.

5. The electrical switch of claim 1, wherein the hinged armature moves between the first position with the moveable contact contacting a normally closed contact and the second position with the moveable contact contacting a normally open contact, and wherein the rib limits movement of the hinged armature between the first position and the outer edge of the electrical switch.

6. The electrical switch of claim 1 wherein the rib is molded into the enclosure.

7. The electrical switch of claim 1 wherein the rib is a cuboid.

8. The electrical switch of claim 1 further comprising:
a fixed armature, wherein the hinged armature is rotatably connected to the fixed armature about a hinge; and
a yoke disposed on the hinged armature, wherein the yoke limits separation of the fixed armature and the hinged armature about the hinge.

9. The electrical switch of claim 1, wherein the hinged armature moves outside the path of travel upon application of the external force, and wherein the rib limits the movement of the hinged armature outside the path of travel.

10. The electrical switch of claim 1, wherein limiting the movement of the hinged armature outside the path of travel prevents deflection of the moveable contact.

11. The electrical switch of claim 1, wherein the hinged armature is limited in movement in two axes.

12. The electrical switch of claim 1 further comprising:
a contact of a magnetic coil, wherein the hinged armature touches the contact of the magnetic coil in the second position.

13. The electrical switch of claim 12, wherein the hinged armature moves away from the contact of the magnetic coil in the first position.

14. The electrical switch of claim 13, wherein the contact of the magnetic coil is disposed distal from the rib.

15. The electrical switch of claim 1, wherein the moveable contact remains disposed substantially parallel to the hinged armature after the external force is applied to the electrical switch by limiting movement of the hinged armature outside of the path of travel.

16. The electrical switch of claim 1, wherein the rib does not interfere with an operation of the electrical switch during movement of the hinged armature from the first position to the second position.

17. The electrical switch of claim 1, wherein the rib is made of a non-electrically conductive material.

18. The electrical switch of claim 1, wherein a space is provided between the hinged armature and the rib in the first position.

19. The electrical switch of claim 18, wherein a minimum width of the space provided between the hinged armature and the rib in the first position is an allowable deflection of the hinged armature prior to damage occurring.

20. The electrical switch of claim 1 wherein the rib is adhered to the enclosure.

* * * * *